D. F. GROAT.
TIRE OPERATED MULTIPLE AIR PUMP.
APPLICATION FILED APR. 17, 1920.
1,423,607. Patented July 25, 1922.
2 SHEETS—SHEET 1.
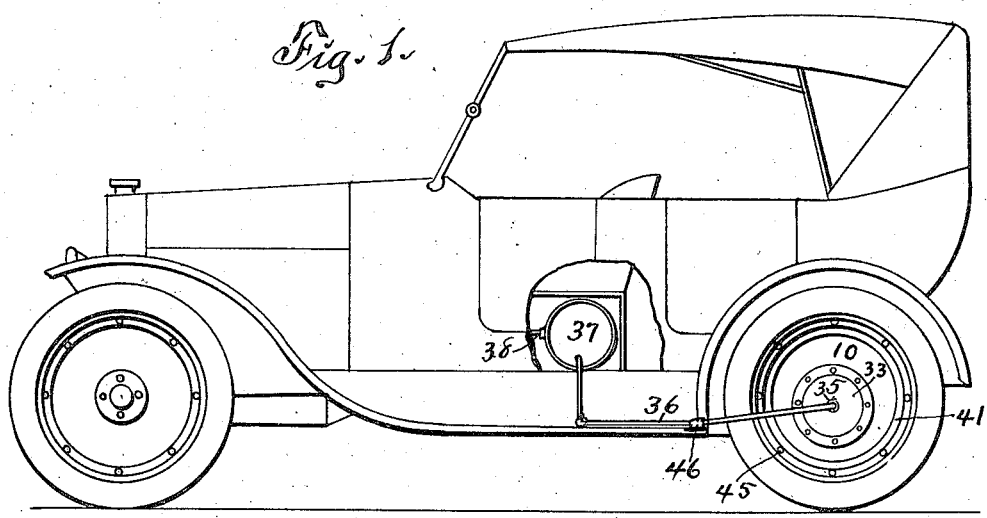
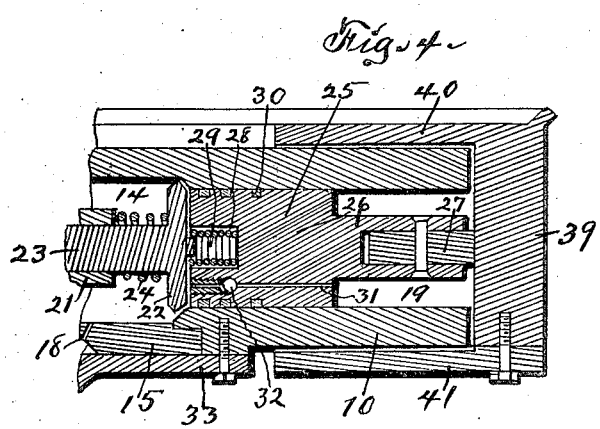
Inventor:
Daniel F. Groat
By Silas L. Sweet
Atty D. F. GROAT.
TIRE OPERATED MULTIPLE AIR PUMP.
APPLICATION FILED APR. 17, 1920.
1,423,607.
Patented July 25, 1922.
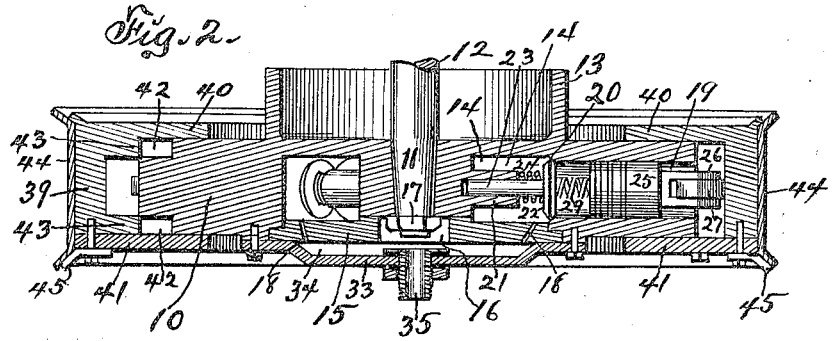
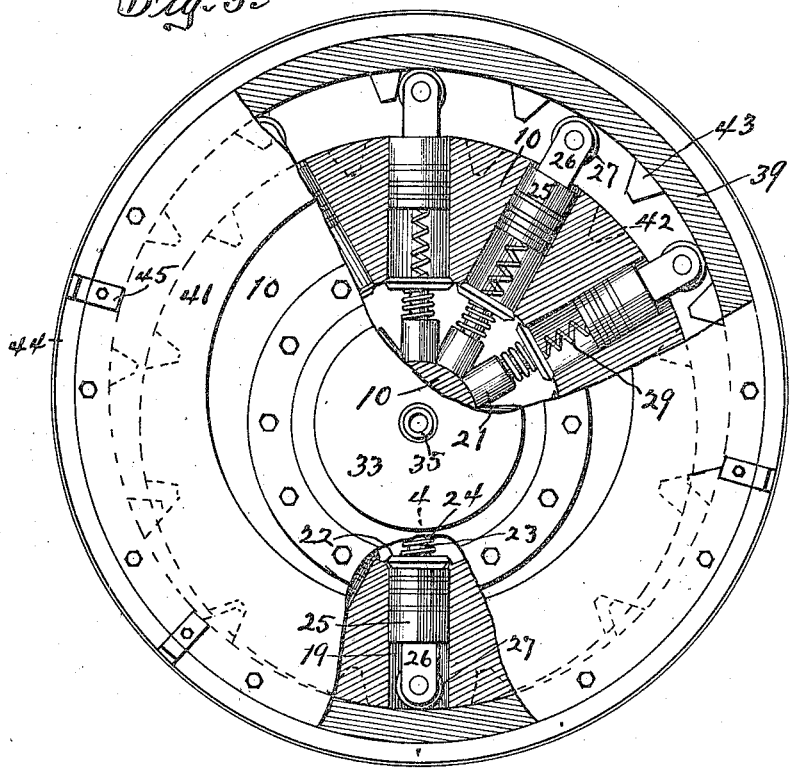
Inventor:
Daniel F. Groat
By Silas E. Sweet
Atty

UNITED STATES PATENT OFFICE.

DANIEL F. GROAT, OF FORT DODGE, IOWA.

TIRE-OPERATED MULTIPLE AIR PUMP.

1,423,607.   Specification of Letters Patent.   Patented July 25, 1922.

Application filed April 17, 1920. Serial No. 374,561.

*To all whom it may concern:*

Be it known that I, DANIEL F. GROAT, a citizen of the United States of America, and resident of Fort Dodge, Webster County, Iowa, have invented a new and useful Tire-Operated Multiple Air Pump, of which the following is a specification.

The object of this invention is to provide improved means for pumping air under pressure into a tank or container, from which it may be led for use.

A further object of this invention is to provide an improved construction for a pump adapted to drive air under pressure to a tank or container.

A further object of this invention is to provide an improved construction for a supporting wheel adapted to carry and operate one or more pumps, said pumps being adapted to deliver air under pressure to a tank or container.

A further object of this invention is to provide means whereby a tire of a supporting wheel may be utilized to operate one or more pumps adapted to drive air under pressure to a tank or container.

A further object of this invention is to provide an improved construction for a wheel adapted to carry one or more air pumps and a tire on said wheel adapted to operate said pumps for the delivery of air under pressure to a tank or container.

My invention consists in the construction, arrangement and combination of elements hereinafter set forth, pointed out in my claims and illustrated by the accompanying drawing, in which—

Figure 1 is a side elevation of a conventionalized automobile showing my improved device mounted thereon as required for practical use. Figure 2 is a diametrical section of the devices shown in Figure 3. Figure 3 is an elevation, partly in section, illustrating my improved wheel and the pumps therein. Figures 2 and 3 are on an enlarged scale relative to Figure 1. Figure 4 is a radial section, on the indicated line 4—4 of Figure 3 on a further enlarged scale, the demountable rim and lugs therefor, not being shown.

In the construction of the devices as shown, the numeral 10 designates a combined hub and web portion of a wheel, preferably in elevation and formed with a central opening adapted to receive a spindle 11 of an axle 12, to which said wheel may be locked and secured in any suitable manner. A brake-drum 13 is shown projecting from one side of the wheel and integral with the web thereof, which brake drum surrounds and preferably is concentric with the axle 12. An annular chamber 14 is formed in and opens to one side of the wheel member 10 and preferably is concentric with the central hole in said member. The annular chamber 14 preferably is closed by a circular plate 15 rabbitted at its rim in the member 10 and said plate preferably is formed with a central hole 16 to accommodate an axle-nut 17 on the spindle 11, and with a series of holes 18 near its rim and communicating with said chamber. A plurality of cylinders or bores 19 are formed in, radially of and uniformly spaced circumferentially of the wheel member 10 and afford communication from the chamber 14 through the rim of said member. A valve seat 20, opening to the chamber 14, is formed at the inner end of each cylinder or bore 19. Sockets 21 are formed on the hub of the wheel member 10, one socket for each cylinder or bore 19, and said sockets register with and open toward said cylinders. Valves 22 are provided, one for each of the seats 20, and the stems 23 of said valves are slidingly mounted in the sockets 21, expansive coil springs being interposed between said valves and the outer ends of said sockets and tending to hold said valves on their seats. Pistons 25 are mounted for reciprocation in the several cylinders or bores 19 and stems 26 on said pistons extend outwardly therefrom centrally of the cylinders and are bifurcated. Anti-friction wheels or rollers 27 are mounted in the forks of the stems 26 and are pivoted thereto on axes parallel with the axis of the spindle 11. A cavity 28 is formed in the central portion, and opens to the inner end of each piston 25 and an expansive coil spring 28, of less strength than the spring 24, is mounted in each cavity and impinges at its opposite ends respectively on the bottom of the cavity and the other face of the valve 22. Each piston 25 is provided with suitable circumferential packing rings 30 adapted to seal it to the wall of the cylinder within which it operates against the leakage of air. An ingress port 31 is formed in and longitudinally of each piston 25 and each port communicates between the outer end of a cylinder and the chamber 14 and is controlled by a check valve 32 arranged to prevent return of air through said port from said chamber. A housing plate 33 is mounted on the wheel member 10 and overlies and is spaced from the plate 15, thus producing a chamber 34 communicating with the forks 18 and adapted to receive air from the chamber 14. A nipple 35 is mounted centrally in and swiveled relative to the housing plate 33 and a pipe 36 is fixed to and communicates with said nipple at one end and leads therefrom to a tank or container 37 adapted to be mounted on an automobile, said tank being provided with a discharge pipe 38 adapted to lead to a place of use of compressed air, such as an air operated engine or motor forming a part of said automobile. A rim 39, of annular form, and of suitable construction, is mounted outside, and surrounds the periphery of the wheel member 10, said rim being formed with a flange 40, also of annular form, overlapping at its inner margin on one side of the wheel member 10 preferably adjacent to the brake-drum 13. A retaining ring 41 is mounted on the rim 39 opposite to the flange 40 and overlaps like unto said flange, on the opposite face or side of the wheel member 10. The joints between the flange 40 and ring 41 and wheel member 10 are not air tight, permitting air to enter freely the space between the rim and wheel member and the outer ends of the cylinders 19. The valves 22 normally are held to their seats by the springs 24 reacting on the sockets 21 and the pistons normally are pressed outwardly so that the wheels or rollers 27 engage the inner surface of the rim 39 by the springs 29 reacting on the valves. The wheel member 10 is formed with a plurality of tapering notches 42 in its periphery and opening to the sides thereof and a plurality of tapering lugs 43 adapted to fit said notches are formed on and projecting inwardly from the inner surface of said rim. The rim 39 is susceptible of being arranged concentric with and spaced from the perimeter of the wheel member 10; but when said wheel is mounted for use as shown, it carries a load sufficient to depress the wheel member 10 into contact at its lowermost point with the inner surface of the lower portion of said rim, thus arranging the rim eccentric to the wheel member. When so arranged, in use, the rim resting on or supported by a tire relative to the ground or road surface, some of the lugs 43 engage in some of the notches 42 and key the rim and wheel member 10 together for conjunctive rotation. The inner surface of the rim 39 is at all times in contact with each of the anti-friction wheels or rollers 27 (Figure 3), said wheels reacting on said rim from the pressure of the springs 29. The notches 42 and lugs 43 are arranged in annular rows on opposite sides of the anti-friction wheels 27, thus avoiding contact of said wheels with said lugs. The rim 39 may be shaped and arranged to carry a demountable rim 44 removably secured thereto by lugs 45 in a common manner, and said demountable rim may carry a tire of any suitable construction in connection therewith.

When the elements are mounted as shown and the automobile is operated by gravity or other draft means, the pistons are successively moved toward the chamber 14 by contact of the rim 39 with the anti-friction wheels 27. Such successive movement of the pistons, alternated with return movements of the pistons by the springs, tends to fill the chamber 14 with air under pressure and said air is led from said chamber through the holes 18, chamber 34, nipple 35 and pipe 36 and is delivered under pressure to the tank 37. When sufficient air has been accumulated in the tank 37, it may be utilized to drive an air operated engine or motor, which may be carried on and form the prime mover of said automobile. When the air operated engine constitutes the prime mover of the automobile and is employed to drive the axle 12 and rotate the wheel 10, the rim 39 is caused to travel by interengagement of the lugs 43 and notches 42, causing the rim successively to act upon and operate the pistons to the end of pumping air into the chamber 14 from which it is conveyed to the tank 37. Thus, subject to travel of the rim 39 on a surface resisting the load carried by the wheel member 10, the pumps are successively operated for the delivery of air under pressure to the tank 37.

It is to be understood that any number of the pumping wheels may be employed in connection with the automobile and deliver air pumped therein to the same or different tanks and any of the pipes 36 may be supplied with suitable check valves, as indicated at 46 in Figure 1, adapted to prevent return of air from the tank to the wheel.

I claim as my invention—

1. A tire operated air pump, comprising a non-tubular axle, a wheel member mounted on and for rotation with said axle and formed with radial cylinders and also formed with an annular air chamber communicating with said cylinders and devoid of communication with said axle, valves controlling the communication between said chamber and cylinders, pistons mounted for reciprocation in said cylinders and adapted to discharge air to said chamber, means for returning said pistons from the compression strokes thereof, and a rim loosely mounted on said wheel member and adapted successively to engage and produce compression strokes of said pistons.

2. A tire operated air pump comprising a non-rotatable axle, a supporting wheel member mounted on and for rotation with said axle and formed with an annular air chamber adjacent its hub devoid of communication with said axle and cylinders radiating therefrom and communicating through the rim thereof, spring-seated valves controlling the inner ends of said cylinders, pistons mounted in said cylinders and provided with valve controlled ports, means for moving said pistons outwardly in said cylinders and a wheel rim mounted loosely around the perimeter of the supporting wheel member and adapted successively to engage and move said pistons inwardly in said cylinders.

3. A tire operated air pump comprising a supporting wheel member mounted for rotation with a suitable axle and formed with a hub and an annular air chamber adjacent to and surrounding said hub and devoid of communication with the axle and cylinders radiating therefrom and communicating through the rim thereof, spring-seated valves controlling the inner ends of said cylinders, pistons mounted in said cylinders and provided with valve controlled ports, springs reacting on said valves for moving said pistons outwardly in said cylinders and a wheel rim mounted loosely around the perimeter of the supporting wheel member and adapted successively to engage and move said pistons inwardly in said cylinders, and inter-engaging means on said wheel member and rim extraneous to said piston.

4. A tire operated air pump comprising a supporting wheel member mounted for rotation with a suitable axle and formed with a hub and an annular air chamber adjacent to and surrounding said hub and devoid of communication with the axle and cylinders radiating therefrom and communicating through the rim thereof, spring-seated valves controlling the inner ends of said cylinders, pistons mounted in said cylinders and provided with valve controlled ports, means for moving said pistons outwardly in said cylinders and a wheel rim mounted loosely around the perimeter of the supporting wheel member and adapted successively to engage and move said pistons inwardly in said cylinders, and inter-engaging means on said wheel member and rim extraneous to said pistons, said rib being provided with means for supporting a tire thereon.

5. In a device of the class described, a wheel member containing a hub an air chamber adjacent to and surrounding said hub, a plate adapted to close one side of said air chamber and provided with ports, said chamber being devoid of an inward outlet, a housing plate overlying the first plate and spaced therefrom, a nipple swiveled in said housing plate and means for pumping air into said chamber.

6. In a device of the class described a wheel member formed with a hub, an annular chamber adjacent to and surrounding said hub and cylinders radiating from and opening at their inner ends to said annular chamber, there being sockets formed on said hub and radiating therefrom in line with the centers of said cylinders, there also being valve seats formed on the inner ends of the walls of the cylinders, valves formed with stems slidingly mounted in said sockets, said valves being adapted to engage said seats at times, springs on said stems impinging at opposite ends on the sockets and valves, pistons mounted in said cylinders and means for moving said pistons in opposite directions.

7. In a device of the class described a wheel member formed with a hub, an annular chamber adjacent to and surrounding said hub and cylinders radiating from and opening at their inner ends to said chamber, there being sockets formed on said hub and radiating therefrom in line with the centers of said cylinders, there also being valve seats formed on the inner ends of the walls of the cylinders, valves formed with stems slidingly mounted in said sockets, said valves being adapted to engage said seats at times, springs on said stems impinging at opposite ends on the sockets and valves, pistons mounted in said cylinders, means for moving said pistons toward said hub, and springs between and reacting on the pistons and valves respectively for moving said pistons outwardly, the first springs being of greater strength than the second springs.

Signed at Fort Dodge, in the county of Webster and State of Iowa, this 12th day of April, 1920.

DANIEL F. GROAT.